(12) United States Patent
Rekow (10) Patent No.: US 7,509,199 B2
(45) Date of Patent: Mar. 24, 2009

(54) SYSTEM AND METHOD FOR CALCULATING INSTANTANEOUS PLACEMENT CORRECTIONS TO ACHIEVE TOWED IMPLEMENT PLACEMENT ON CURVED PATHS

(75) Inventor: Andrew Karl Wilhelm Rekow, Cedar Falls, IA (US)

(73) Assignee: Deere & Company, Moline, IL (US)

( * ) Notice: Subject to any disclaimer, the term of this patent is extended or adjusted under 35 U.S.C. 154(b) by 129 days.

(21) Appl. No.: 11/479,605

(22) Filed: Jun. 30, 2006

(65) Prior Publication Data

US 2008/0004778 A1    Jan. 3, 2008

(51) Int. Cl.
*G06F 7/70* (2006.01)
*G06F 19/00* (2006.01)
*G06G 7/00* (2006.01)
*G06G 7/76* (2006.01)

(52) U.S. Cl. .............................. 701/50; 701/33; 701/41; 701/81; 701/88; 701/89; 342/357.17; 342/357.13; 348/118; 348/169; 348/120

(58) Field of Classification Search .................. 701/33, 701/41, 50, 81, 88, 89; 342/357.17, 357.13; 348/118, 169, 120
See application file for complete search history.

(56) References Cited

U.S. PATENT DOCUMENTS

| 5,438,517 | A | * | 8/1995 | Sennott et al. ............... 701/213 |
| 5,505,267 | A | * | 4/1996 | Orbach et al. ................... 172/3 |
| 5,555,503 | A | * | 9/1996 | Kyrtsos et al. ............... 701/207 |
| 5,572,218 | A | * | 11/1996 | Cohen et al. ........... 342/357.06 |
| 5,610,815 | A | * | 3/1997 | Gudat et al. ..................... 701/23 |
| 5,629,855 | A | * | 5/1997 | Kyrtsos et al. ............... 701/300 |
| 5,646,843 | A | * | 7/1997 | Gudat et al. ..................... 701/3 |
| 5,646,845 | A | * | 7/1997 | Gudat et al. ................... 701/41 |
| 5,680,313 | A | * | 10/1997 | Whittaker et al. ........... 701/300 |
| 5,684,696 | A | * | 11/1997 | Rao et al. ...................... 701/25 |
| 5,764,511 | A | * | 6/1998 | Henderson .................... 700/66 |
| 5,802,489 | A | * | 9/1998 | Orbach et al. ................. 701/50 |
| 5,838,562 | A | * | 11/1998 | Gudat et al. ................. 701/213 |
| 5,951,613 | A | * | 9/1999 | Sahm et al. .................... 701/50 |
| 5,991,694 | A | * | 11/1999 | Gudat et al. ..................... 702/2 |
| 6,037,901 | A | * | 3/2000 | Devier et al. ........... 342/357.17 |
| 6,052,647 | A | * | 4/2000 | Parkinson et al. ............ 701/215 |
| 6,199,000 | B1 | * | 3/2001 | Keller et al. .................. 701/50 |
| 6,434,462 | B1 | * | 8/2002 | Bevly et al. .................... 701/50 |
| 6,688,403 | B2 | * | 2/2004 | Bernhardt et al. ............... 172/2 |
| 2005/0056438 | A1 | * | 3/2005 | Nordhoff ..................... 172/439 |
| 2007/0112493 | A1 | * | 5/2007 | McClure et al. ............... 701/50 |

OTHER PUBLICATIONS

Bevly, DM., Parkinson, B.W. "Carrier-Phase Differential GPS for Control of a Tractor Towed Implement," Proceeding of the 2000 ION-GPS Meeting, Salt Lake City, Utah, Sep. 2000.*

(Continued)

*Primary Examiner*—Khoi Tran
*Assistant Examiner*—Jorge O Peche
(74) *Attorney, Agent, or Firm*—Suiter Swantz pc llo (57) ABSTRACT

A global positioning system (GPS) based navigation and steering control system for ground vehicles, in particular, agricultural ground vehicles such as tractors, combines, sprayers, seeders, or the like, calculates instantaneous placement corrections to achieve desired towed implement placement on curved paths, and a method for same.

17 Claims, 5 Drawing Sheets

OTHER PUBLICATIONS

David Mark Bevly; "High Speed Dead Reckoning, and Towed Implement Control for Automatically Steered Farm Tractors Using GPS"; Aug. 2001; Stanford University PhD Dissertation.

David Bevly et al.; "Carrier-Phase Differential GPS for Control of a Tractor Towed Implement"; Sep. 2000; 6 pages.

F. Lamiraux et al.; "A Practical Approach to Feedback Control for a Mobile Robot with Trailer"; May 1998; p. 3291-3296.

Patrick Y.C. Hwang; "Kinematic GPS for Differential Positioning: Resolving Integer Ambiguities on the Fly"; Oct. 1990; pp. 1-15.

R.P. Van Zuydam; "Centimeter-Precision Guidance of Agricultural Implements in the Open Field by Means of Real Time Kinematic DGPS"; Jul. 1998; pp. 1023-1034.

Jussi Mononen et al.; "Development of Autonomous Vehicles for Commercial and Government Applications"; May 1994; 10 pages.

T. Nieminen et al.; Development of a Control System for Autonomous Agriculture Vehicles; 1996; 8 pages.

L.A. Smith et al.; "Control Algorithms for Tractor-Implement Guidance"; Jan. 1985; pp. 415-419.

Turo Nieminin et al.; "Unmanned Tractors for Agricultural Applications"; Sep. 1994; 12 pages.

Michael L. O'Connor et al.; "Carrier-Phase DGPS for Closed-Loop Control of Farm and Vehicles"; 1996; pp. 167-178.

W.E. Larsen et al.; "Precision Navigation with GPS"; 1994; pp. 86-95.

David M. Bevly et al.; "Evaluation of a Blended Dead Reckoning and Carrier Phase Differential GPS System for Control of an Off-Road Vehicle"; Sep. 1999; 5 pages.

D.M. Bevly et al.; "Yaw Dynamic Modeling for Improved High Speed Control of a Farm Tractor"; 2000; 4 pages.

Olivier Fachard; "What—No Driver on the Tractor?"; Date unknown; 1 page.

* cited by examiner

SYSTEM AND METHOD FOR CALCULATING INSTANTANEOUS PLACEMENT CORRECTIONS TO ACHIEVE TOWED IMPLEMENT PLACEMENT ON CURVED PATHS

FIELD OF THE INVENTION

The present invention generally relates to the field of global positioning system (GPS) based navigation and steering control systems for ground vehicles such as tractors, combines, sprayers, seeders, or the like, and particularly to a system and method for calculating instantaneous placement corrections to achieve desired towed implement placement on curved paths.

BACKGROUND OF THE INVENTION

A shortcoming of global positioning system (GPS) based navigation and steering control systems used in agricultural ground vehicles is that the global positioning system receiver of such systems can only determine the position of the global positioning system antenna. On most ground vehicles, the mounting location for the global positioning system antenna is constrained by the requirement that a clear view of the sky, and thus the global positioning system satellites, be provided to the antenna.

As a consequence of this limitation, current global positioning system based navigation and steering control systems take only ground vehicle receiver position into account when regulating ground vehicle position. However, implements towed by the ground vehicle will tend to drift to the inside of a constant radius turn. This drift is especially problematic to operators when making headland turns. During a headland turn, the towed implement will drift to the inside of the turn. When the operator lowers the implement after the turn, a significant initial lateral error can be exhibited. To compensate for this error, a skilled operator will often intentionally overshoot the desired track with the ground vehicle in order to pull the towed implement more quickly onto the line along the track. However, less skilled operators may fail to make this compensation, resulting in uneven tillage or application of seed and/or chemicals (e.g., fertilizer, herbicide, and the like) particularly near the periphery of a field.

Consequently, it would be advantageous to provide a global positioning system (GPS) based navigation and steering control system for agricultural ground vehicles such as tractors, or the like, which employs a system and method for calculating instantaneous placement corrections to achieve desired towed implement placement on curved paths for both headland turns and in field operations.

SUMMARY OF THE INVENTION

The present invention is directed to a global positioning system (GPS) based navigation and steering control system for an agricultural ground vehicle such as a tractor, or the like, which employs a system and method for calculating the instantaneous placement corrections to achieve desired towed implement placement on curved paths for both headland turns and in field operations.

In exemplary embodiments, the instantaneous placement corrections may be any or all three of the instantaneous ground vehicle offset, heading offset, and/or the feed forward steering angle, or the like.

In one exemplary embodiment the present invention provides a system for controlling the steering of a ground vehicle towing an implement to achieve a desired placement of the towed implement on a curved path. In this embodiment, the system includes a processing system and a steering control unit. The processing system determines instantaneous placement corrections from a predetermined track along the curved path for a ground vehicle for achieving a desired towed implement trajectory along the curved path. The steering control unit uses the instantaneous placement corrections for correcting the trajectory of the ground vehicle. The steering control unit adjusts the path of the ground vehicle so that the towed implement at least substantially follows the curved path.

In a second exemplary embodiment, the present invention provides a method for controlling the steering of a ground vehicle towing an implement to achieve a desired placement of the towed implement on a curved path. The method includes determining instantaneous placement corrections from a predetermined track along the curved path for the ground vehicle for achieving a desired towed implement trajectory along the curved path and correcting the trajectory of the ground vehicle using the instantaneous placement corrections for adjusting the path of the ground vehicle so that the towed implement at least substantially follows the curved path.

It is to be understood that both the forgoing general description and the following detailed description are exemplary and explanatory only and are not restrictive of the invention as claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION OF THE INVENTION

Reference will now be made in detail to the presently preferred embodiments of the invention, examples of which are illustrated in the accompanying drawings.

Figure 1:
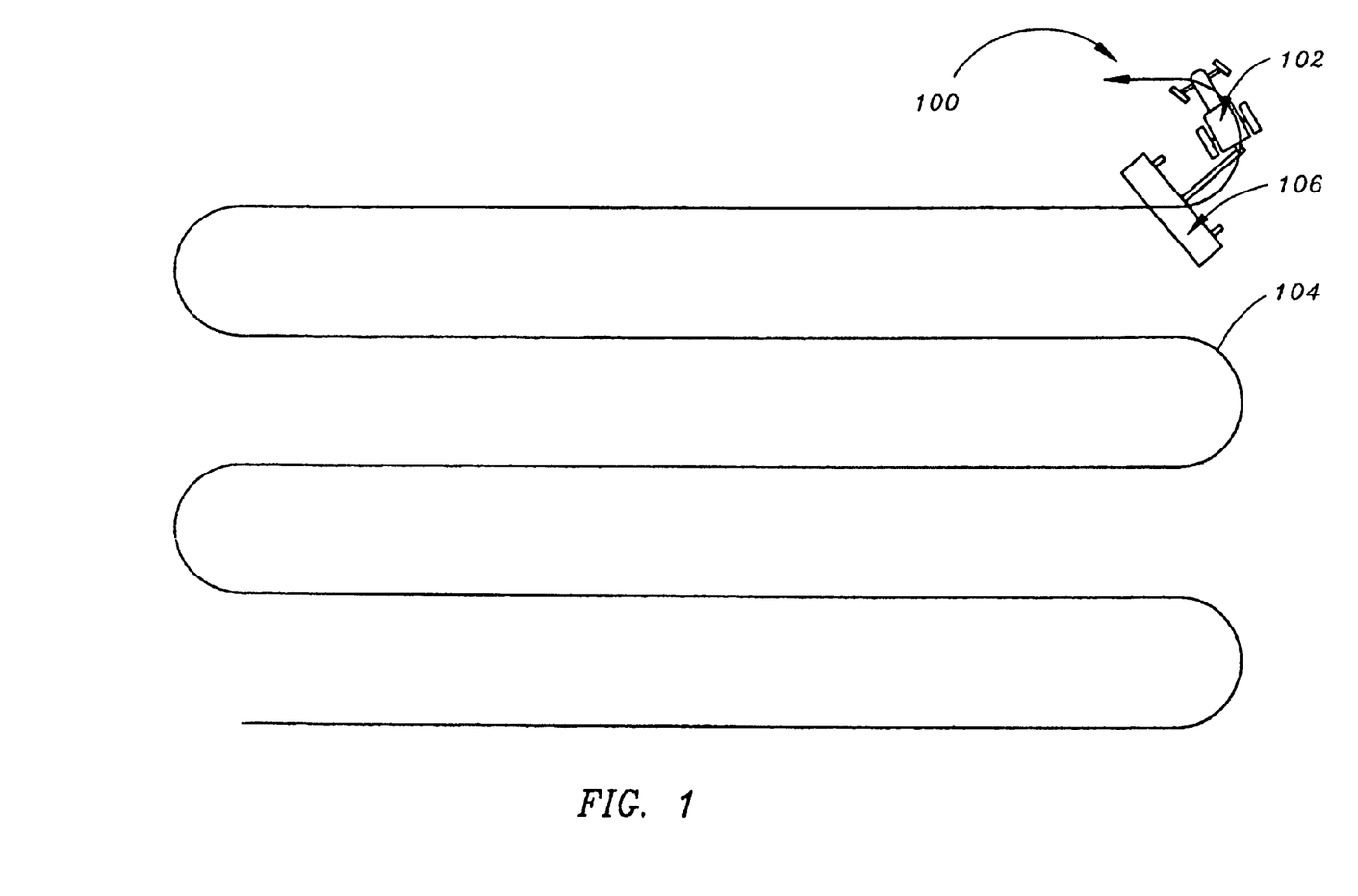
FIG. 1 is an overhead view illustrating an exemplary ground vehicle towing an implement through a curved path in accordance with an exemplary embodiment of the present invention.
Figure 2:
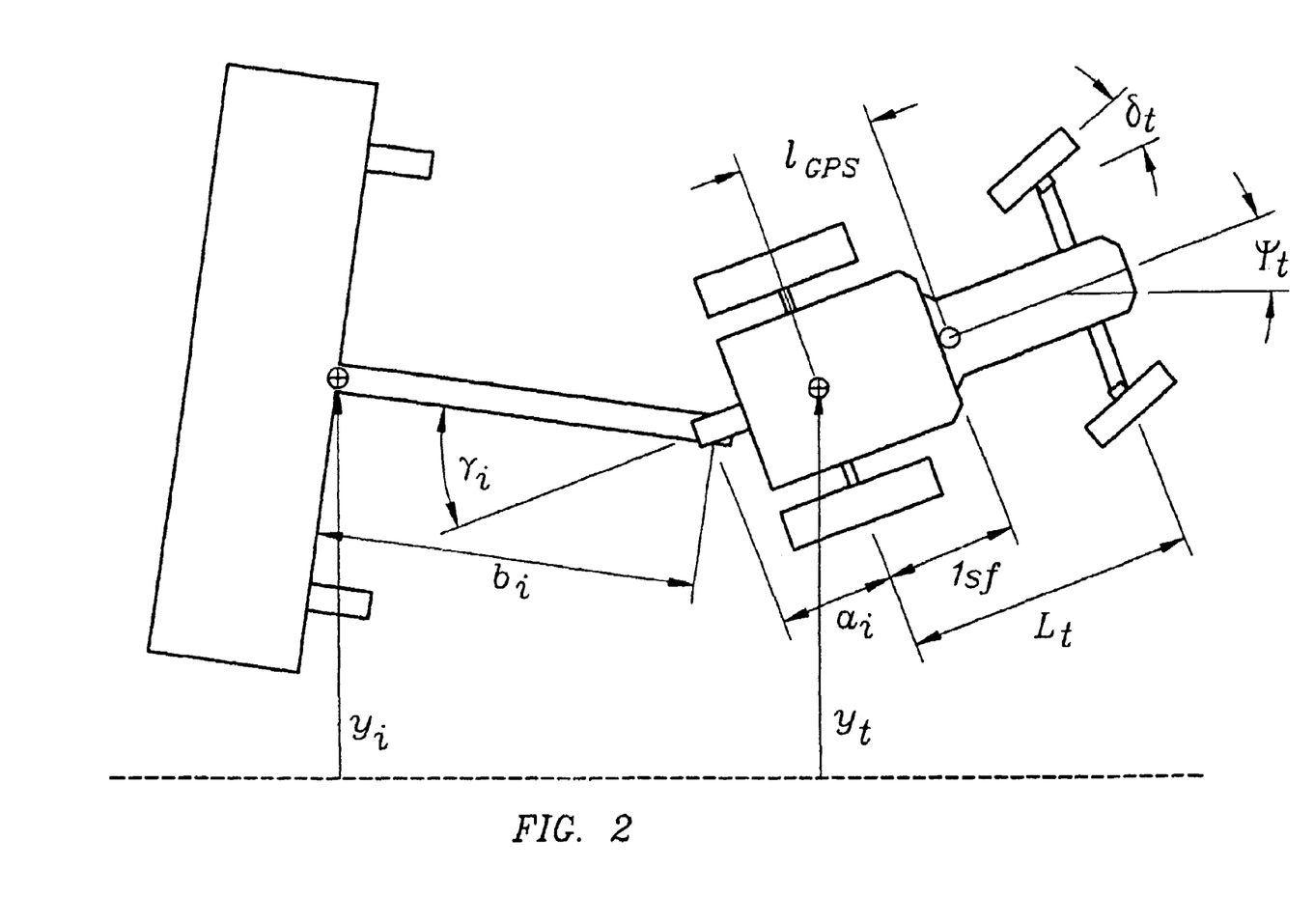
FIG. 2 is a top plan view further illustrating the ground vehicle and towed implement shown in FIG. 1.

FIGS. 1 and 2 illustrate an agricultural ground vehicle 102 employing an exemplary global positioning system (GPS) based navigation and steering control system 100 in accordance with an exemplary embodiment of the present invention. The navigation and steering control system 100 provides global positioning system based navigation and/or steering for a ground vehicle 102 (FIG. 2), particularly, an agricultural ground vehicle 102 such as a tractor, combine, sprayer, seeder, or the like, as the ground vehicle 102 traverses a path 104 or track within a field. In accordance with the present invention, the navigation and steering control system 100 calculates instantaneous placement corrections required for a ground vehicle 102 towing an implement 106 to achieve desired placement of the towed implement 106 on curved paths 104 for both headland turns and in field operations. In exemplary embodiments, the instantaneous placement corrections may be any or all three of the instantaneous ground vehicle offset $\Delta y(t)$, heading offset $\Delta \Psi(t)$, and/or the feed forward steering angle $\Delta \delta$, or the like. The navigation and steering system 100 reports this calculation to the steering control unit 108 (FIG. 3.) for steering the ground vehicle 102. FIG. 1 illustrates the ground vehicle 102 towing an implement 106 through a curved path 104 in accordance with an exemplary embodiment of the present invention. The curved path 104 delineates the corrected path of the implement 106 rather than the ground vehicle 102. FIG. 2 further illustrates the exemplary ground vehicle 102 and implement 106 shown in FIG. 1.

In exemplary embodiments, the global positioning system receiver 112 receives positioning signals from the Global Positioning System (GPS), a space-based radio-navigation system managed by the United States Air Force for the Government of the United States. However, it is contemplated that the global positioning system receiver 112 may alternatively be adapted for use with other radio based navigation/global positioning systems such as the GLONASS Navigation Satellite System managed by the Russian Space Agency (RSA) for the Russian Federation. Additionally, in embodiments of the invention, the global positioning system receiver 112 may be capable of receiving and utilizing enhanced positioning information provided by differential GPS (DGPS) systems and wide area differential GPS (WADGPS) systems such as the STARFIRE™ WDGPS system developed by Deere & Company of Moline, Ill., the Wide Area Augmentation System (WAAS) provided by the Federal Aviation Administration of the United States Government, the Galileo System initiated by the European Union, or the like. In such embodiments, the global positioning system receiver 112 may include, or be coupled to, a radio receiver for receiving differential error correction information.

Figure 3:
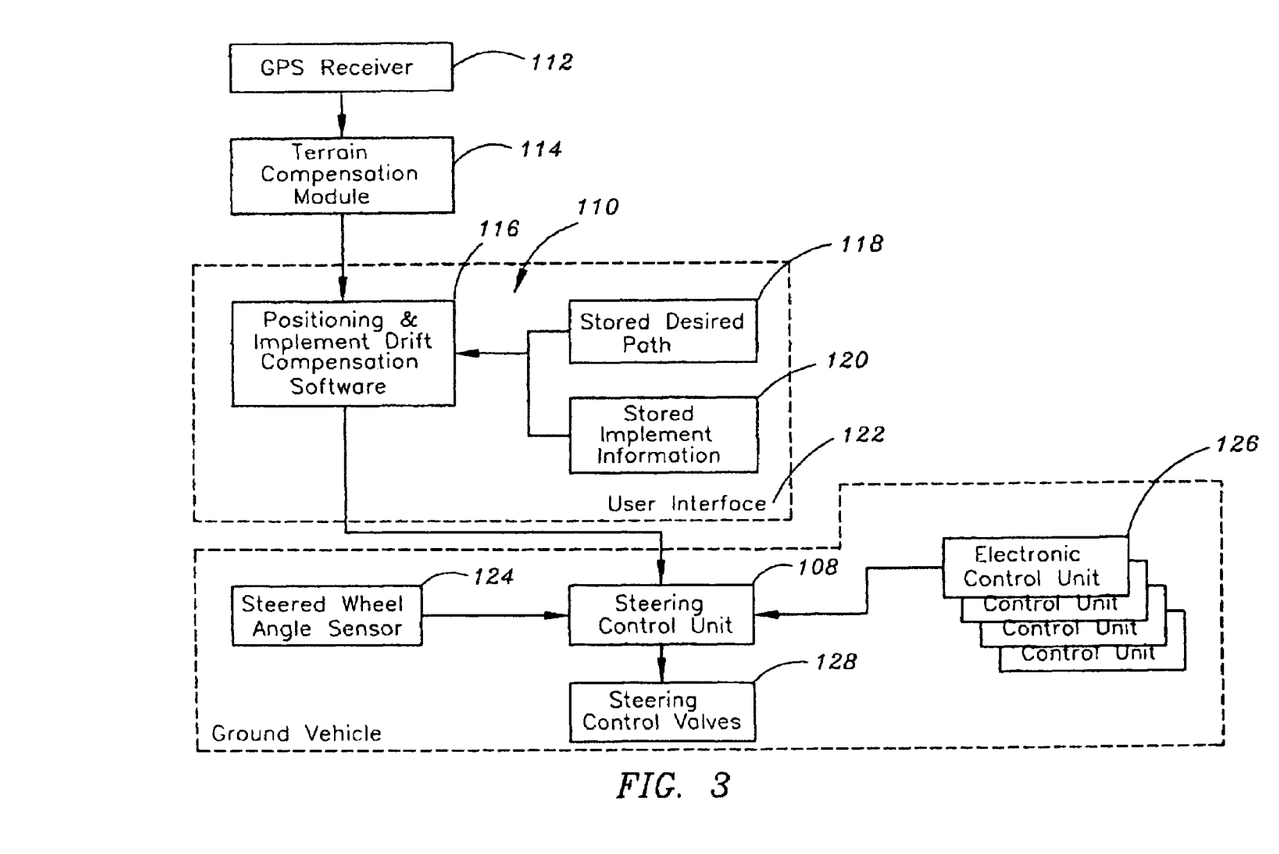
FIG. 3 is a block diagram illustrating a global positioning system (GPS) based navigation system employing the method for calculating instantaneous placement corrections to achieve desired towed implement placement on curved paths in accordance with an exemplary embodiment of the present invention.

FIG. 3 is a block diagram illustrating a global positioning system (GPS) based navigation and steering system 100 employing the system 100 and method 200 for calculating instantaneous placement corrections to achieve desired placement of a towed implement 106 on curved paths 104 in accordance with an exemplary embodiment of the present invention. In particular, FIG. 3 demonstrates the relationship between the position and implement drift compensation system 110 of the present invention and the existing GPS receiver 112 and terrain compensation module system 114. Data from both the GPS receiver 112 and the terrain compensation module 114 feed into the positioning and implement drift compensation software 116. The stored desired path 118 and the stored implement information 120 complement the positioning and implement drift compensation software 116 to achieve the desired placement of the towed implement 106. These complementary pathways 116, 118, 120, are accessed via the user interface 122, the point of interaction between the human operator and the computerized navigation system. This collaborative information is then transferred to the ground vehicle's steering control unit 108. At the steering control unit 108, this data ultimately combines with data from both the steered wheel angle sensor 124 and the electronic control unit 126. The steering control unit 108 then manipulates the steering control valves 128.

Figure 4:
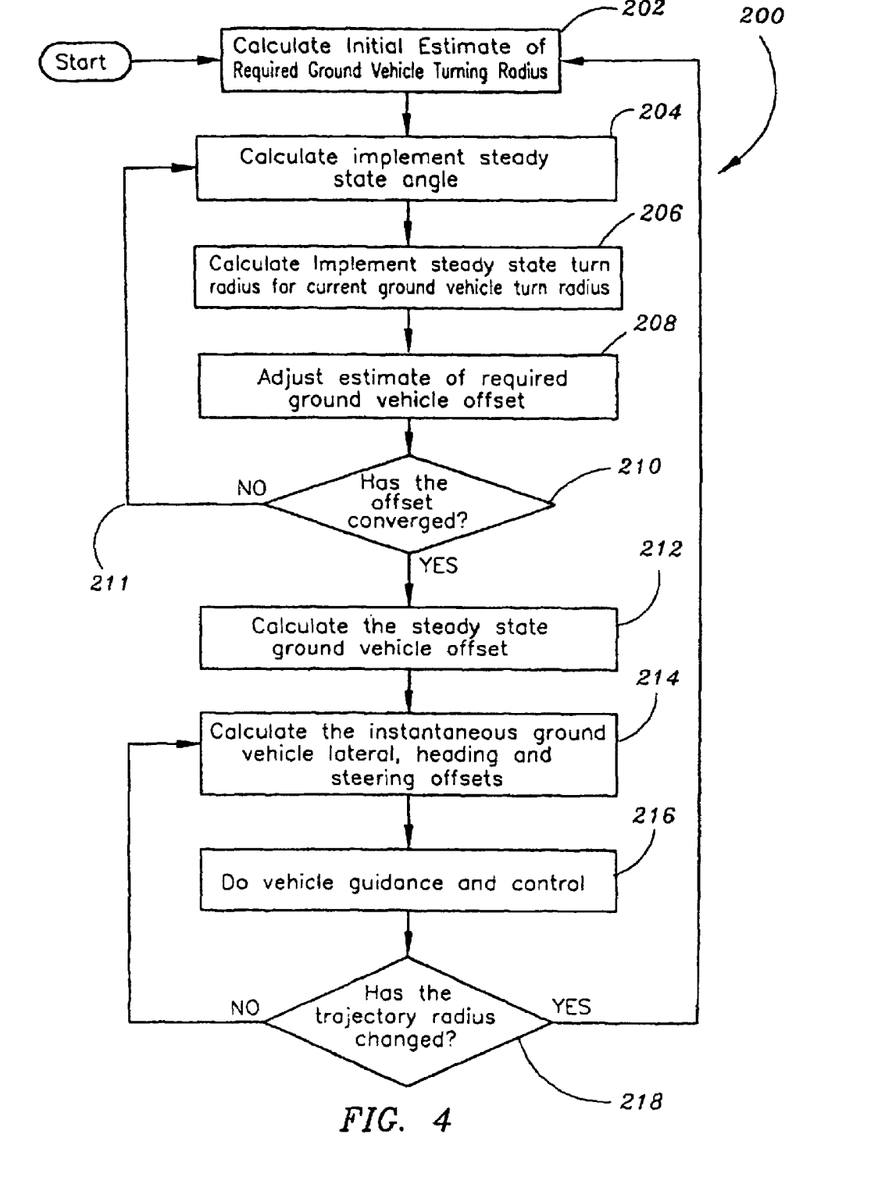
FIG. 4 is a flow diagram illustrating a method for calculating instantaneous placement corrections to achieve desired towed implement placement on curved paths.

Referring now to FIG. 4, an exemplary method 200 is described for calculating the instantaneous placement corrections required to achieve desired placement of a towed implement 106 on curved paths 104 for both headland turns and in field operations. As shown, an initial estimate of the required ground vehicle turning radius to seed the iterative process is calculated, at step 202.

In one embodiment, a reasonable seed value can be the desired radius of the implement 106. However, in other embodiments, a more accurate estimate can be achieved by solving the following equation:

$$R_{ground\_vehicle} = R_{segment} + [b_i(a_i+b_i) + \frac{1}{2}(a_i+b_i)^2] \qquad \text{EQN. 1}$$

where $R_{ground\_vehicle}$ is the initial guess of the required ground vehicle turning radius, $R_{segment}$ is the desired implement turning radius, $a_i$ is the distance from the center of the ground vehicle rear axle to the drawbar pin and $b_i$ is the distance from the drawbar pin to the turning center of the implement (i.e. tongue length.) (FIG. 2).

Next, the steady state implement angle $\gamma_{ss}$ is calculated, at step 204. The implement angle $\gamma$ is the angle between the centerlines of the towing ground vehicle 102 and the implement 106. The implement angle $\gamma$ is zero when the centerlines are aligned with each other such as on a long, straight line. During turns the implement angle $\gamma$ can be modeled using the equation:

$$\frac{\partial \gamma}{\partial s} = \rho\left(1 + \frac{a_i}{b_i}\cos\gamma\right) - \frac{\sin\gamma}{b_i} \qquad \text{EQN. 2}$$

Where $\gamma$ is the implement angle; s is the along track distance; and $\rho$ is the ground vehicle trajectory curvature (1/radius).

Figure 5:
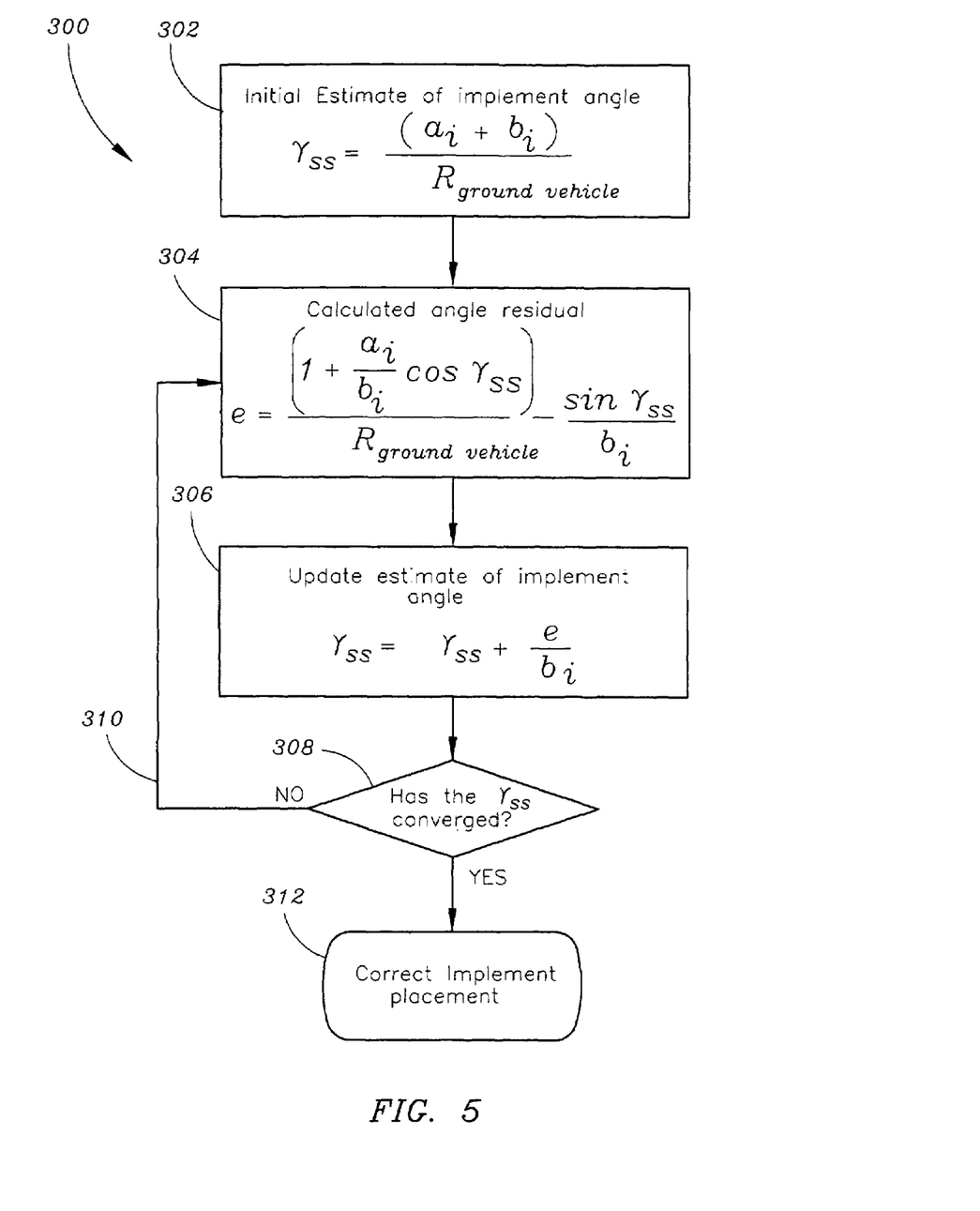
FIG. 5 is a flow diagram illustrating an iterative process to calculate the steady state implement angle, used in the method for calculating the instantaneous placement corrections to achieve desired towed implement placement on curved paths.

During constant radius turns, the implement angle $\gamma$ reaches a steady state. FIG. 5 illustrates an exemplary iterative process 300 to calculate the steady state implement angle $\gamma_{ss}$ for step 204. The steady state implement angle $\gamma_{ss}$ can then be used to calculate how much the implement 106 will drift to the inside of a constant radius turn.

At step 302, the iterations are initialized by using the solution to EQN. 1, $R_{ground\_vehicle}$, to find the initial estimate of the steady state implement angle $\gamma_{ss}$. The initial estimate is thus found using the equation:

$$\gamma_{ss} = \frac{(a_i + b_i)}{R_{ground\_vehicle}} \qquad \text{EQN. 3}$$

This linearized solution provides the required steady state implement angle $\gamma_{ss}$ for the implement in order to maintain the desired implement turn radius.

Next, at step 304, upon determining the desired implement turn radius, the steady state implement angle residual error (e) may be determined (see EQN. 4). The steady state implement angle residual error (e) is the value of the rate of change of the angle with respect to the along track distance. The steady state implement angle residual error (e) is calculated using the equation:

$$e = \frac{\left(1 + \frac{a_i}{b_i}\cos\gamma_{ss}\right)}{R_{ground\_vehicle}} - \frac{\sin\gamma_{ss}}{b_i} \qquad \text{EQN. 4}$$

Next, at step 306, the steady state implement angle residual error (e) approximation from EQN. 4 is iteratively utilized in EQN. 5 to correct the estimated steady state implement angle $\gamma_{ss}$ until convergence is achieved.

$$\gamma_{ss} = \gamma_{ss} + \frac{e}{b_i} \qquad \text{EQN. 5}$$

Next, the user determines if the steady state implement angle $\gamma_{ss}$ has converged, at step 308. If the steady state implement angle $\gamma_{ss}$ estimate has not converged upon completion of EQN. 5, the method 300 includes a direction 310 to repeat steps 304, 306, and 308. Typically, the steady state implement angle $\gamma_{ss}$ estimate will converge per step 312 to less than 0.1° within two to three iterations.

Once steady state implement angle $\gamma_{ss}$ is calculated, as shown in FIG. 4, the steady state implement turning radius $R_{implement}$ for the current ground vehicle 102 turn is calculated, at step 206 (see FIG. 4) In steady state, on a constant radius turn, the radius of the track of the implement 106 is related to the track of the ground vehicle 102 by the equation:

$$R_{implement} = R_{ground\_vehicle} \cos\gamma_{ss} + a_i \sin\gamma_{ss} \qquad \text{EQN. 6}$$

Therefore, for any ground vehicle turning radius $R_{ground\_vehicle}$, the steady state implement turning radius $R_{implement}$ may be calculated. If the resulting steady state implement turning radius $R_{implement}$ is not satisfactory for the current ground vehicle radius, the steady state implement turning radius $R_{implement}$ can be adjusted by the steady state implement angle residual error (e), at step 208.

Next, the operator may determine if the offset has converged, at step 210. If not, per step 211, this adjustment in the ground vehicle radius $R_{ground\_vehicle}$ may affect the steady state implement angle $\gamma_{ss}$ enough to require recalculation of the previous steps 204, 206, and 208.

In accordance with the present invention, once the required ground vehicle radius $R_{ground\_vehicle}$ estimate has converged, the steady state offset of a ground vehicle, $\Delta y_{ss}$, may be calculated at step 212 using the equation:

$$\Delta y_{ss} = R_{ground\_vehicle} - R_{implement} + R_{ground\_vehicle}\left(1 - \cos\frac{l_{GPS}}{R_{ground\_vehicle}}\right) \qquad \text{EQN. 7}$$

where $l_{GPS}$ is the distance from the turning center of the ground vehicle 102 to the global positioning system (GPS) antenna. The last term in the above equation is included to account for the differences in radii between the turning center of the ground vehicle 102 and the measured GPS positions. The steady state offset of a ground vehicle, $\Delta y_{ss}$, is calculated, at step 212, of the present method 200.

Although EQN. 7 calculates the steady state offset of a ground vehicle, $\Delta y_{ss}$, implementation of the steady state offset of a ground vehicle, $\Delta y_{ss}$, must address segment transitions that occur during the ground vehicle's 102 travel for truly proper execution. If the global positioning navigation system were to instantly track the steady state offset of a ground vehicle $\Delta y_{ss}$ the implement 106 may depart the ending segments too soon during segment transitions. This problem is addressed by filtering the trajectory of the ground vehicle 102 with implement kinematics. The method 200 includes a calculation at step 214 of instantaneous placement corrections pursuant to these kinematics; the instantaneous ground vehicle offset $\Delta y(t)$ (EQN. 8), heading offset $\Delta\Psi(t)$ (EQN. 9), and/or the feed forward steering angle $\Delta\delta$, (EQN. 10) 212. In the time domain, the instantaneous ground vehicle offset $\Delta y(t)$ is determined using the equation:

$$\frac{d}{dt}\Delta y(t) = \frac{V_x}{2b_i}(\Delta y_{ss}(t) - \Delta y(t)) \qquad \text{EQN. 8}$$

To provide better control system tracking, a heading offset $\Delta\Psi(t)$ may also be utilized. This is approximated by the rate of change the lateral offset with respect to along track position using the equation:

$$\Delta\Psi(t) = \frac{\Delta y_{ss}(t) - \Delta y(t)}{2b_i} \qquad \text{EQN. 9}$$

Additionally, the feed forward steering angle $\Delta\delta$ that may be used by the ground vehicle 102 to follow the curve is $$\Delta\delta = \tan^{-1}\frac{L}{R_{ground\_vehicle}} \qquad \text{EQN. 10}$$

Where L is the wheelbase of the ground vehicle 102 (e.g., tractor).

Next, the instantaneous ground vehicle offset, $\Delta y(t)$, heading offset $\Delta\Psi(t)$, and the feed forward steering angle $\Delta\delta$, calculated in method 200 are used for adjusting the path 104 of the ground vehicle 102 so that the towed implement 106 at least substantially follows the desired curved path 104, at step 214. The operator may perform vehicle guidance and control, at step 216. If the trajectory radius has changed, step 218 provides a return to 202. If the trajectory radius has not changed, step 218 provides a return to step 214.

In exemplary embodiments, the methods disclosed may be implemented as sets of instructions comprising software or firmware readable by the steering control unit 108, position and implement drift compensation system 110, or the like. Further, it is understood that the specific order or hierarchy of steps in the methods disclosed are examples of exemplary approaches. Based upon design preferences, it is understood that the specific order or hierarchy of steps in the method can be rearranged while remaining within the scope of the present invention. The accompanying method claims present elements of the various steps in a sample order, and are not meant to be limited to the specific order or hierarchy presented.

It is believed that the present invention and many of its attendant advantages will be understood by the forgoing description. It is also believed that it will be apparent that various changes may be made in the form, construction and arrangement of the components thereof without departing from the scope and spirit of the invention or without sacrificing all of its material advantages. The form herein before described being merely an explanatory embodiment thereof. It is the intention of the following claims to encompass and include such changes.

What is claimed is:

1. A method for controlling the steering of a ground vehicle towing an implement to achieve a desired placement of the towed implement on a curved path, comprising:
   calculating an initial estimate of a required ground vehicle turning radius for the ground vehicle;
   calculating a steady state implement angle for the towed implement;
   calculating a steady state implement turning radius for the ground vehicle turn radius;
   adjusting the initial estimate of a required ground vehicle turning radius for the ground vehicle;
   determining if the initial estimate of a required ground vehicle turning radius for the ground vehicle has converged;
   calculating the steady state offset of the ground vehicle;
   calculating an instantaneous ground vehicle offset, a heading offset and a feed forward steering angle for the ground vehicle; and
   adjusting the path of the ground vehicle based on the instantaneous ground vehicle offset, the heading offset and the feed forward steering angle for the ground vehicle to allow the towed implement to at least substantially follow the curved path.

2. The method as claimed in claim 1, further comprising determining if the trajectory of the ground vehicle has changed.

3. The method as claimed in claim 1, wherein the initial estimate of a required ground vehicle turning radius is determined from:

$$R_{ground\_vehicle} = R_{segment} + [b_i(a_i + b_i) + \tfrac{1}{2}(a_i + b_i)^2]$$

where $R_{ground\_vehicle}$ is the initial ground vehicle turning radius, $R_{segment}$ is the desired implement turning radius, $a_i$ is a distance from the center of the ground vehicle rear axle to the drawbar pin and $b_i$ is the distance from the drawbar pin to the turning center of the implement.

4. The method as claimed in claim 1, wherein the steady state implement angle for the towed implement is determined from:

$$\frac{\partial \gamma}{\partial s} = \rho\left(1 + \frac{a_i}{b_i}\cos\gamma\right) - \frac{\sin\gamma}{b_i}$$

where $\gamma$ is the implement angle; s is an along track distance; and $\rho$ is a ground vehicle trajectory curvature (1/radius), $a_i$ is a distance from the center of the ground vehicle rear axle to the drawbar pin and $b_i$ is the distance from the drawbar pin to the turning center of the implement.

5. The method as claimed in claim 1, wherein the initial estimate of the steady state implement angle is determined from:

$$\gamma_{ss} = \frac{(a_i + b_i)}{R_{ground\_vehicle}}$$

where $\gamma_{ss}$ is the steady state implement angle, the angle residual is determined from:

$$e = \frac{\left(1 + \frac{a_i}{b_i}\cos\gamma_{ss}\right)}{R_{ground\_vehicle}} - \frac{\sin\gamma_{ss}}{b_i}$$

where e is the angle residual, and the revised estimate of the steady state implement angle is determined from:

$$\gamma_{ss} = \gamma_{ss} + \frac{e}{b_i}.$$

6. The method as claimed in claim 1, wherein the steady state ground vehicle offset is determined from:

$$\Delta y_{ss} = R_{ground\_vehicle} - R_{implement} + R_{ground\_vehicle}\left(1 - \cos\frac{l_{GPS}}{R_{ground\_vehicle}}\right)$$

where $l_{GPS}$ is a distance from a turning center for the ground vehicle to an antenna of a global positioning system receiver mounted to the ground vehicle and $R_{implement}$ is the steady state implement turning radius which is determined from:

$$R_{implement} = R_{ground\_vehicle}\cos\gamma_{ss} + a_i\sin\gamma_{ss}.$$

7. The method as claimed in claim 1, wherein the instantaneous ground vehicle offset is determined from:

$$\frac{d}{dt}\Delta y(t) = \frac{V_x}{2b_i}(\Delta y_{ss}(t) - \Delta y(t))$$

where $V_x$ is the velocity of the ground vehicle.

8. The method as claimed in claim 1, wherein an instantaneous placement correction is determined from:

$$\Delta\Psi(t) = \frac{\Delta y_{ss}(t) - \Delta y(t)}{2b_i}$$

and the feed forward steering angle determined from:

$$\Delta\delta = \tan^{-1}\frac{L}{R_{ground\_vehicle}}$$

where L is a wheelbase of the ground vehicle.

9. A system for controlling the steering of a ground vehicle towing an implement to achieve a desired placement of the towed implement on a curved path, comprising: and
   a position and implement drift compensation module receiving data from a global positioning system (GPS) receiver and a terrain compensation module, and receiving a stored desired path and stored implement information, the position and implement drift compensation module further configured to:
   calculate an initial estimate of a required ground vehicle turning radius for the ground vehicle;
   calculate a steady state implement angle of the ground vehicle;
   calculate a steady state implement turning radius for the ground vehicle turn radius;

adjust the initial estimate of a required ground vehicle turning radius for the ground vehicle;

determine if the initial estimate of a required ground vehicle turning radius for the ground vehicle has converged;

calculate the steady state offset of the ground vehicle; and calculate an instantaneous ground vehicle offset, a heading offset and a feed forward steering angle for the ground vehicle; and a user interface for accessing one or more of the positioning and implement drift compensation module, the stored desired path, or the stored implement information and communicating with a steering control unit for combining one or more of the positioning and implement drift compensation information, the stored desired path information, or the stored implement information with data received from at least one of a steered wheel angle sensor or an electronic control unit for manipulating one or more steering control valves for correcting the trajectory of the ground vehicle using the instantaneous placement corrections and adjusting the path of the ground vehicle so that the towed implement at least substantially follows the curved path.

10. The system as claimed in claim 9, wherein the position and implement drift compensation module further determines if the trajectory of the ground vehicle has changed.

11. A system for controlling the steering of a ground vehicle towing an implement to achieve a desired placement of the towed implement on a curved path, comprising:

a position and implement drift compensation module receiving data from a global positioning system (GPS) receiver and a terrain compensation module, and receiving a stored desired path and stored implement information, the position and implement drift compensation module further configured to:

calculate an initial estimate of a required ground vehicle turning radius for the ground vehicle;

calculate a steady state implement angle of the ground vehicle;

calculate a steady state implement turning radius for the ground vehicle turn radius;

adjust the initial estimate of a required ground vehicle turning radius for the ground vehicle;

determine if the initial estimate of a required ground vehicle turning radius for the ground vehicle has converged;

calculate the steady state offset of the ground vehicle;

calculate an instantaneous ground vehicle offset, a heading offset and a feed forward steering angle for the ground vehicle; and adjust the path of the ground vehicle based on the instantaneous ground vehicle offset, the heading offset and the feed forward steering angle for the ground vehicle to allow the towed implement to at least substantially follow the curved path.

12. The system as claimed in claim 11, wherein the position and implement drift compensation module is further configured to: determine if the trajectory of the ground vehicle has changed.

13. The method as claimed in claim 1, wherein the calculating a steady state implement angle for the towed implement further includes:

determining an initial estimate of the steady state implement angle;

determining a steady state implement angle residual error; and correcting the estimated steady state implement angle by iteratively inputting the steady state implement angle residual error until convergence is achieved.

14. The system as claimed in claim 9, wherein the position and implement drift compensation module is further configured to:

determine an initial estimate of the steady state implement angle;

determine a steady state implement angle residual error; and correct the estimated steady state implement angle by iteratively inputting the steady state implement angle residual error until convergence is achieved.

15. The system as claimed in claim 14, wherein the position and implement drift compensation module is further configured to:

determine an initial estimate of the steady state implement angle from the equation:

$$\gamma_{ss} = \frac{(a_i + b_i)}{R_{ground\_vehicle}}.$$

16. The system as claimed in claim 14, wherein the position and implement drift compensation module is further configured to:

determine a steady state implement angle residual error from the equation:

$$e = \frac{\left(1 + \frac{a_i}{b_i}\cos\gamma_{ss}\right)}{R_{ground\_vehicle}} - \frac{\sin\gamma_{ss}}{b_i}.$$

17. The system as claimed in claim 14, wherein the position and implement drift compensation module is further configured to:

correct the estimated steady state implement angle by iteratively inputting the steady state implement angle residual error into the following equation until convergence is achieved:

$$\gamma_{ss} = \gamma_{ss} + \frac{e}{b_i}.$$

* * * * *